Patented May 15, 1951 2,552,935

UNITED STATES PATENT OFFICE 2,552,935

SOLDERS

Richard Chadwick, Birmingham, and William G. Heaton, Sutton Coldfield, England, assignors to Imperial Chemical Industries Limited, a corporation of Great Britain No Drawing. Application September 7, 1950, Serial No. 183,660. In Great Britain November 16, 1949

2 Claims. (Cl. 75—175)

This invention relates to improved solders of the tin/zinc class containing a preponderating proportion of tin, for use particularly in soldering aluminum or aluminum base alloys.

Solders of this class have been known for many years and there has been a number of proposals for modifying them by the addition of various minor constituents such for example as aluminium, bismuth, lead, phosphorus, silver.

One of the major requirements in a solder is good fluidity to enable uniform spreading and complete coverage of the surface to be bonded, and the object of this invention is to provide an improved solder having in particular a considerably improved degree of fluidity in comparison with previously suggested solders of this class.

According to the present invention we provide a solder of the kind described containing 69.9 to 98.9% tin, 1 to 30% zinc, and 0.1 to 5% cerium.

In addition to the improved fluidity, the cerium also exerts a beneficial effect on the corrosion resistance of the solder. If desired the solder may also contain 0.1–5% of aluminium for the purpose of further increasing its corrosion resistance. The cerium content may conveniently be added in the form of misch metal. In the accompanying table there are given comparative corrosion and fluidity data for a series of alloys in accordance with the present invention and the corresponding basic alloys not containing cerium. The corrosion results are expressed in terms of the time to failure, in hours, of soldered lap joints of aluminium in a salt spray cabinet, and the fluidity readings are represented by the spread of a standard 1 gram sample of solder on a fluxed sheet of aluminium held at the stated temperature.

*Table*

| Composition, Per Cent | | | | Time to failure of lap joint in hours | Fluidity (spread of drop in mm.) at— | | |
|---|---|---|---|---|---|---|---|
| Sn | Zn | Al | Ce | | 300° C. | 350° C. | 400° C. |
| 95 | 5 | ------ | ------ | 450 | 13 | 36 | 45 |
| 94.5 | 5 | ------ | 0.5 | 550 | 26 | 44 | 78 |
| 90 | 10 | ------ | ------ | 200 | 14 | 36 | 48 |
| 89.5 | 10 | ------ | 0.5 | 400 | 28 | 45 | 81 |
| 88 | 10 | ------ | 2 | 500 | 30 | 52 | 90 |
| 80 | 20 | ------ | ------ | 1,050 | 13 | 31 | 42 |
| 79.5 | 20 | ------ | 0.5 | 1,300 | 27 | 42 | 75 |
| 78 | 20 | ------ | 2 | 1,400 | 31 | 50 | 84 |
| 75 | 25 | ------ | ------ | 1,400 | -------- | 25 | 36 |
| 74.5 | 25 | ------ | 0.5 | 1,550 | -------- | 36 | 52 |
| 88 | 10 | 2 | ------ | 650 | 18 | 36 | 47 |
| 87.5 | 10 | 2 | 0.5 | 750 | 25 | 39 | 67 |
| 86 | 10 | 2 | 2 | 850 | 29 | 50 | 78 |
| 78 | 20 | 2 | ------ | 1,650 | 17 | 34 | 45 |
| 77.5 | 20 | 2 | 0.5 | 1,800 | 27 | 46 | 68 |
| 76 | 20 | 2 | 2 | 1,950 | -------- | 54 | 80 |

We claim:

1. Solder containing 69.9–98.9% tin, 1–30% zinc, and 0.1–5% cerium.

2. Solder in accordance with claim 1, containing in addition 0.1–5% aluminium.

RICHARD CHADWICK.
WILLIAM G. HEATON.

No references cited.